United States Patent
Kogan et al.

(10) Patent No.: US 9,502,717 B2
(45) Date of Patent: Nov. 22, 2016

(54) AIR ELECTRODE CATALYST

(71) Applicants: Iakov Kogan, Etobicoke (CA); Anna Khomenko, Etobicoke (CA)

(72) Inventors: Iakov Kogan, Etobicoke (CA); Anna Khomenko, Etobicoke (CA)

(73) Assignee: PANISOLAR INC., Mississauga, Ontario (CA)

( * ) Notice: Subject to any disclaimer, the term of this patent is extended or adjusted under 35 U.S.C. 154(b) by 341 days.

(21) Appl. No.: 14/199,697

(22) Filed: Mar. 6, 2014

(65) Prior Publication Data

US 2014/0302407 A1    Oct. 9, 2014

Related U.S. Application Data

(60) Provisional application No. 61/808,189, filed on Apr. 3, 2013.

(51) Int. Cl.
  *H01M 4/02* (2006.01)
  *H01M 4/88* (2006.01)
  *H01M 4/90* (2006.01)

(52) U.S. Cl.
  CPC ......... *H01M 4/8882* (2013.01); *H01M 4/9041* (2013.01); *H01M 4/9075* (2013.01); *H01M 4/9083* (2013.01); *Y02E 60/50* (2013.01)

(58) Field of Classification Search
  CPC .................................................... H01M 4/02
  See application file for complete search history.

(56) References Cited

U.S. PATENT DOCUMENTS

| | | |
|---|---|---|
| 7,550,223 B2 | 6/2009 | Zelenay |
| 7,722,981 B2 | 5/2010 | Jang |
| 7,786,037 B2 | 8/2010 | Wang |
| 8,279,435 B2 | 10/2012 | Wang |
| 2002/0132157 A1 | 9/2002 | Finkelshtain |
| 2008/0171656 A1 | 7/2008 | Wang |
| 2010/0048380 A1* | 2/2010 | Calabrese Barton . H01M 4/881 502/5 |
| 2010/0060894 A1 | 3/2010 | Wang |
| 2011/0260119 A1 | 10/2011 | Zelenay |
| 2012/0088187 A1 | 4/2012 | Wu |

OTHER PUBLICATIONS

Gordana Ciric- et al, Chemical papers, 2012. Doi: 10 2479 Carbonised polyaniline and polypyrrole: towards advanced nitrogen-containing carbon materials. Will be uploaded.

* cited by examiner

*Primary Examiner* — Jacob Marks

(57) ABSTRACT

This invention proposes metal complexes of polyphenylenediamines as the precursors of carbonized materials used as the air electrode catalysts. Method of production includes mixing phenylenediamine monomer with a catalyst carrier in a solvent, and adding an oxidant with metal salt to produce a metal complex of polyphenylenediamine. After drying the precursor is heat treated in the temperature range 400 C.°-1000 C.° in nitrogen. Then the catalyst is leached and heat treated once again. In a modified procedure the heat treatment is carried out in air while leaching and subsequent thermal treatment are eliminated. The catalyst has demonstrated high performance and stability as the component of the air electrode of a metal-air battery.

20 Claims, 3 Drawing Sheets

AIR ELECTRODE CATALYST

This application claims benefit to U.S. provisional application No. 61/808,189 filed on Apr. 3, 2013.

FIELD OF THE INVENTION

This invention relates to the air electrode catalysts produced by carbonization of the polyphenylenediamine complexes and applied to metal-air batteries.

BACKGROUND OF THE INVENTION

The development of air electrodes for metal-air batteries and fuel cells requires new stable catalysts. Recent progress in the development of carbonized conjugated polymers complexes makes it possible to design catalysts with enhanced catalytic properties and stability.

The use of conjugated polymers as the precursors for carbonized materials increases nitrogen content and reduces the costs of the catalysts. Metal complexes of aniline polymerized on the surface of carbons are among the most prospective precursors for carbonized N-doped air electrode catalysts.

Monomers like aniline are high toxic, and are proved carcinogens for animals. It is desirable to replace these precursors with substances that have lower toxicity. The effectiveness of the N-doped carbon catalysts can be improved with the increase of nitrogen content. For this reason the use of polymer complexes with higher concentration of nitrogen is desirable. The structure of the metal complexes influences the catalytic activity too.

Carbonized conjugated polymers are used as a low cost alternative to noble metal catalysts. However the procedure of catalyst preparation is long and requires expensive (inert atmosphere) ovens that decreases rewards of low cost precursors.

Carbonized catalysts have been applied for air electrodes of the fuel cells with acid electrolytes. It was unobvious that these catalysts were suitable for metal-air batteries operated in alkaline media. The application of conducting polymers (such as polyaniline) in basic form can be problematic because of the absence of electronic conductivity of the polymer in alkaline solutions, a more aggressive media can influence the stability too.

A line of technical solutions for using conjugated polymer complexes as precursors for carbonized catalysts is known and provided below.

Finkelshtain et. al. in U.S. Pat. No 2002/0,132,157 suggested polyaniline, polypyrrole polythiophene and polyfuran complexes with transition metals as precursor for air electrode catalysts. This catalysts were used for membrane-electrode assemblies (MEA) of the fuel cells. The complexes have been reduced before inclusion in MEA.

Zelanay and Bashyam in U.S. Pat. No. 7,550,223 proposed polypyrrole, polyaniline, polythiophene metal complexes as the catalysts. These complexes were exploited as the components of the air electrodes after reduction.

Zelanay and Wu in U.S. Pat. No 2011/0,260,119 proposed a Co—Fe composite catalysts, which outer layer was formed by carbonization of the iron-polyaniline complexes at 900° C. in nitrogen. The catalyst was tested in acid solutions and polymer electrolyte fuel cells.

Zelanay and Wu in U.S. Pat. No 2012/0,088,187 demonstrated polyaniline-iron and polyaniline-cobalt catalysts carbonized in 400° C.-1000° C. temperature range. The fuel cell with these air electrode catalysts demonstrated stable performance at about 0.25 A/cm$^2$ for 200 h. The catalysts was tested in proton based electrolytes. Typical procedure of the carbonized catalysts preparation included the following steps:

1) forming a cold aqueous suspension of the carbon and aniline
2) combining the suspension with an oxidant and transition metal containing compound
3) drying
4) heating in the temperature range 400 C.°-1000 C.° in inert atmosphere
5) leaching with acid
6) repeating step 4.

The objective of the current invention is to produce stable catalysts for air electrodes of the metal air batteries, to decrease the toxicity of the precursors for carbonized catalysts, to decrease the cost of equipment for thermal treatment in air, and to simplify the process by eliminating leaching and subsequent heat treatment.

BRIEF DESCRIPTION OF THE INVENTION

This invention proposes polyphenylenediamines as the precursors of carbonized catalysts for air electrodes. Phenylenediamine is mixed with a catalyst carrier in a solvent, and then combined with an oxidant and a metal salt. After drying the catalyst is heat treated in the temperature range 400 C.°-1000 C.° in nitrogen. Then the catalyst is leached and heat treated once again. In a modified procedure heat treatment is carried out in air while leaching and subsequent thermal treatment are eliminated. FIG. 1 shows possible structure of a m-polyphenylenediamine metal complex used as the precursor in this invention.

DESCRIPTION OF THE INVENTION

Typical procedure of the carbonized catalysts preparation includes in situ polymerization of the phenylenediamine complexes on the surface of the catalyst carriers. Method of production includes mixing phenylenediamine monomer with a catalyst carrier in a solvent, and adding an oxidant with metal salt to produce a metal complex of polyphenylenediamine. The duration of mixing is 0.5 h to 24 h. The amount of the catalyst is about 0.5-20 weight percent in relation to the weight of the carrier. The oxidant to phenylenediamine ratio is in the range from 0.2 to 3. After drying the precursor is heat treated in the temperature range 400 C.°-1000 C.° in nitrogen. Then the catalyst is leached and heat treated once again. In a modified procedure the heat treatment is carried out in air while leaching and subsequent thermal treatment are eliminated. The catalyst has demonstrated high performance and stability as the component of the air electrode of a metal-air battery.

Figure 1:
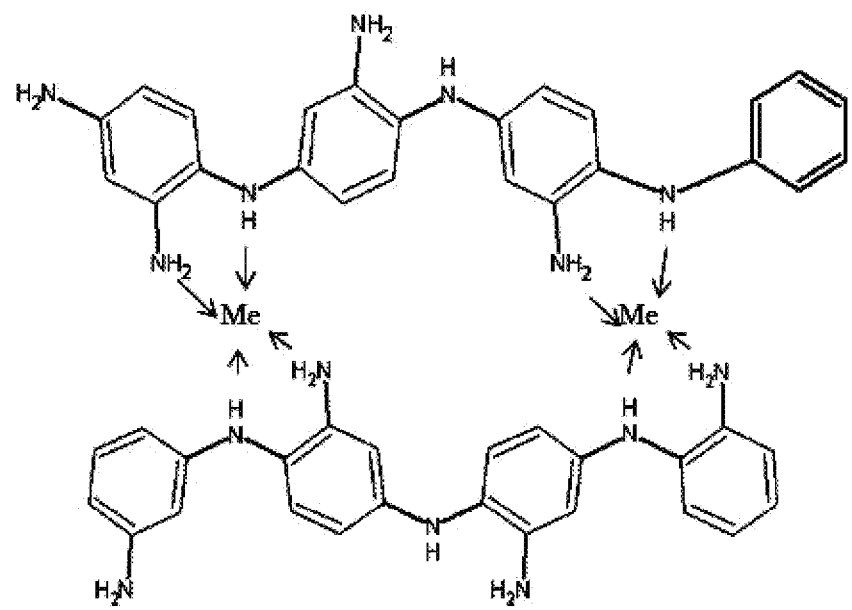
FIG. 1 shows possible structure of poly-m-phenylenediamine metal complex formed by in-situ polymerization
Figure 2:
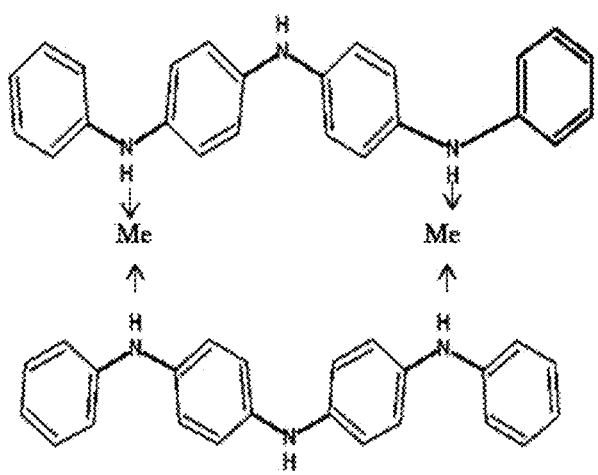
FIG. 2 shows possible structure of polyaniline metal complex for comparison

FIG. 1 shows possible structure of a conjugated polymer precursor formed from m-phenylenediamine monomer. A precursor prepared by polymerization of aniline is shown in FIG. 2 for comparison. The possible structure of the precursor (FIG. 1) includes two nitrogens per one aromatic ring, and complex is formed with four nitrogen groups.

Catalyst carriers are selected from carbon blacks, graphene, graphites, titania, silica and similar substrates. In situ polymerization is carried out in aqueous solutions or their mixtures with organic solvents. Oxidants used to initiate polymerization include ammonium persulfate, potassium persulfate, potassium permanganate, potassium bichromate, hydrogen peroxide, tetrabutylammonium persulfate, iron (III) salts, manganese dioxide, and other inorganic or organic oxidants with redox potentials higher than the potential of polymerization of phenylenediamine monomer.

Iron, cobalt, magnesium, molybdenum, nickel, silver, copper salts and their mixtures can be used to prepare phenylenediamine complexes. These salts can include counterions such as nitrate, bicarbonate, carbonate, acetate, formate, hydrogen sulfate, sulfate, fluoride, chloride, citrate, tartrate and other known anions.

The polymerization can be carried out in acid, neutral or alkaline solutions. Monomers of these invention include metal complexes of m-phenylenediamine, p-phenyldiamine, o-phenyldiamine and their derivatives. Phenylenediamines can be mixed with anilines in ratio 0.05 to 0.5 to obtain co-polymer precursors. The procedure of the precursor deposition can be reversed: an oxidant and a metal salt are mixed with a catalyst carrier first, then a phenylenediamine solution is added to the mixture.

Thermal treatment of the dried precursors is carried out in the temperature range 400 C.°-1000 C.° in nitrogen atmosphere for 0.1 h-10 h. It has been found that the use of a crucible with a cap allows thermal treatment in air. In this case gaseous products of precursor decomposition protect catalyst from oxidation with oxygen of air. The activity and the stability of a carbonized catalyst prepared in the air atmosphere is practically the same as the catalyst processed in the nitrogen atmosphere.

Figure 3:
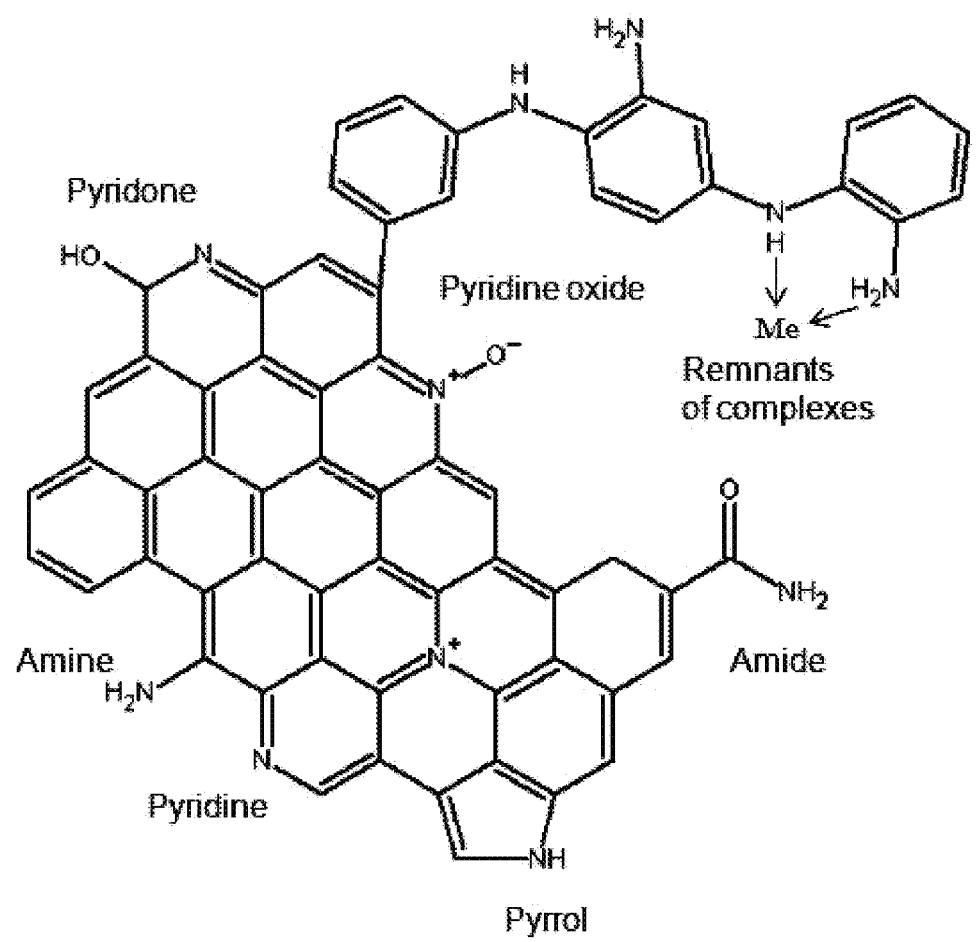
FIG. 3 shows possible structure and active groups of the carbonized catalyst

After heat treatment the catalyst is leached in acid or alkaline solutions. 0.1M-2M $H_2SO_4$ or 0.1M-6M KOH can be used for leaching at 30° C.-80° C. for 0.1 h-10 h. After leaching the sample is dried, and is undergone thermal treatment in the temperature range 400° C.-1000° C. for 0.1 h-10 h. Possible structure and active groups of a carbonized catalyst are presented in FIG. 3. This catalyst can include amine, pyridine, amide, pyridone, pyridine oxide and doped nitrogen groups as well as the remnants of the metal complexes.

A conventional air electrode design has been used to test the catalysts. The catalysts prepared from polyphenelenediamine precursors have the same or higher performance compared to the catalysts with polyaniline precursors.

Figure 4:
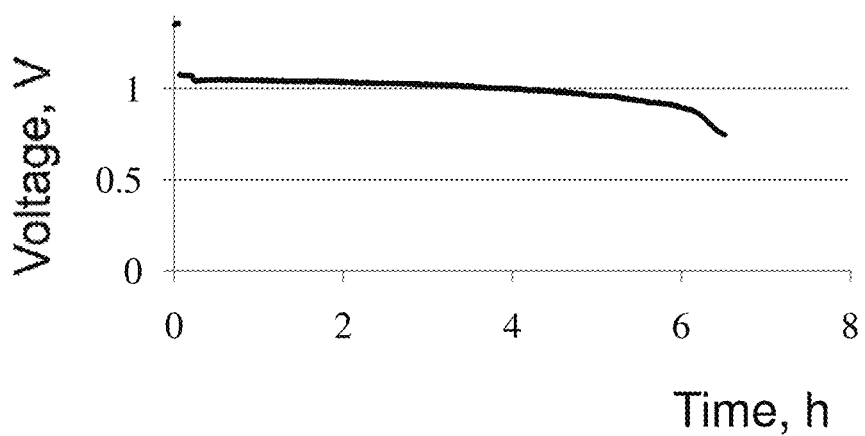
FIG. 4 shows discharge characteristic of a zinc-air battery with carbonized air electrode catalyst at 0.5Ω load

Typical discharge characteristic of a test battery (10 cm*10 cm*1 cm) with the air electrode based on carbonized polyphenylenediamine catalyst is presented in FIG. 4. The battery was designed for tests, and was not optimized for the highest performance.

The duration of discharge depends on discharge current, which is controlled by load resistance. The effectiveness of the catalyst and battery performance could variate when substances or procedures were changed, however the shapes of the discharge curves were identical to the curve in FIG. 4.

Figure 5:
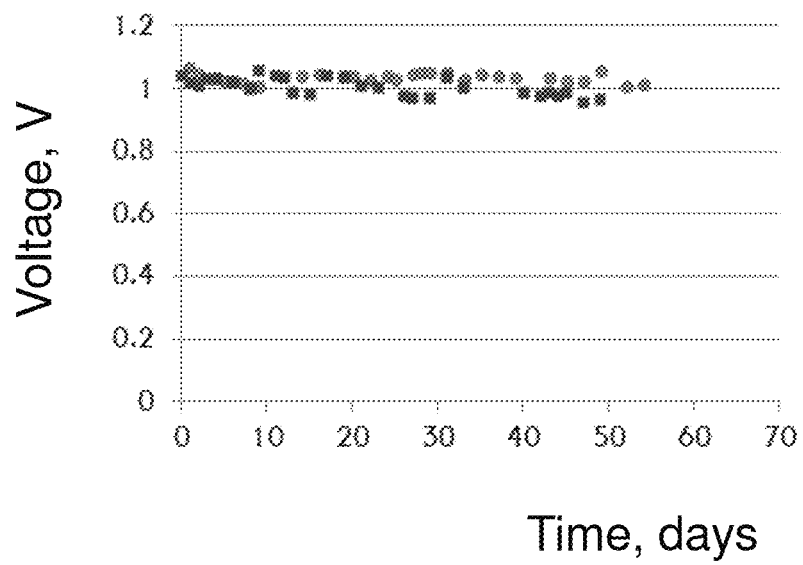
FIG. 5 shows stability characteristics of a zinc-air battery with a carbonized air electrode catalyst

FIG. 5 shows stability characteristics of a zinc-air battery with an electrode catalyst prepared according to this invention. Every point in FIG. 5 is determined for a battery 5 cm*7 cm*0.75 cm after 1 min load to a resistance. A zinc-air battery with the air electrodes of this invention demonstrates high stability of operation. The highest peak current achieved in batteries according to this invention has been 0.25 $A/cm^2$-0.3 $A/cm^2$.

While this application is aimed at the air electrodes of zinc-air batteries, carbonized catalysts produced from polyphenelenediamine precursors can be used for iron-air, aluminum-air, magnesium-air batteries as well as for electrodes of supercapacitors, fuel cells, sensors and field emitters. Carbonized materials can be exploited to produce absorbents and carbon membranes.

This invention is not limited to the details of the illustrative embodiments, and can be materialized in other specific forms without departing from essential attributes thereof, and it is desired that the present embodiments will be considered in all respects as illustrative and not restrictive.

EXAMPLES OF PRACTICAL IMPLEMENTATION

Example 1

12 g of acid treated carbon black was mixed with 0.1 g-mol of m-phenylenediamine in 100 mL of 0.5M HCl solution. Solution of 0.05 g-mol ammonium persulfate and 0.05 g-mol $FeCl_3$ were added to solution at 10° C. and mixed for 24 h. Produced precursor was dried and heat treated at 800° C. for 1 h. Then the sample was leached in 0.5M $H_2SO_4$ at 80° C. for 5 h, washed and heat treated at 800° C. for 1 h again.

The catalyst was used to produce a conventional air electrode that was tested in a zinc-air battery. Voc (open circuit voltage)=1.38V, Ip (peak current)=3 A. Voltage after 1 min load at 3Ω was V@3Ω=1.05V. Ip and V@3Ω had been stable for three months.

Example 2

The catalyst was produced similar to Example 1, however heat treatment at 800° C. was carried out in air atmosphere. Nether leaching nor subsequent heat treatment at 800° C. were performed. The catalyst was used to produce a conventional air electrode, and was tested in a zinc-air battery. The results of tests: Voc=1.36V, Ip=2.8 A, V@3Ω=1V. Ip and V@3Ω had been stable for three months.

The invention claimed is:
1. A method of producing a catalyst that includes following steps
 a. deposition of the precursor on the catalyst support
 b. drying
 c. heating in the temperature range 700° C.-1000° C. wherein
   the deposition of the precursor on the catalyst support is carried out by:
   1) forming a mixture of a catalyst carrier with phenylenediamine in a liquid
   2) adding solution of an oxidant mixed with a metal salt to the mixture prepared in previous step.
2. The method of claim 1 wherein the oxidant of the step 2) is selected from the group consisting of ammonium persulfate, potassium persulfate, hydrogen peroxide, potassium permanganate, iron (III) salts and tetrabutylammonium persulfate.

3. The method of claim 1 wherein the metal salt in step 2) is selected from the group consisting of iron, cobalt, manganese, nickel, molybdenum, silver, copper and mixture thereof.

4. The method of claim 1 wherein the phenylenediamine monomer is selected from the group consisting of m-phenylenediamine, o-phenylenediamine, p-phenylenediamine and a substitute of the mentioned phenylenediamines.

5. The method of claim 1 wherein in step 2) a metal based oxidant is added.

6. The method of claim 1 wherein heating in the temperature range 700° C.-1000° C. (steps c) and e)) is carried out in nitrogen atmosphere.

7. The method of claim 1 wherein heating in the temperature range 700° C.-1000° C. (steps c) and e)) is carried out in the atmosphere of gaseous products of decomposition.

8. The method of claim 1 wherein step c is followed by d) leaching the mixture, and e) heating in the temperature range 700° C.-1000° C.

9. The method of claim 1 wherein leaching (step d)) is carried out in alkaline solution.

10. The method of claim 1 wherein the catalysts support is selected from the group consisting of carbon blacks, graphite, expanded graphite, graphene, titania, silica, and metal nitrides.

11. The catalyst produced by the method of claim 1.

12. The catalyst produced by method of claim 1 wherein the oxidant in the step 2) is selected from the group consisting of ammonium persulfate, potassium persulfate, hydrogen peroxide, potassium permanganate, iron chloride, iron acetate, tetrabutylammonium persulfate, and potassium chlorate.

13. The catalyst produced by method of claim 1 wherein the metal salt in step 2) is selected from group consisting of iron, cobalt, manganese, nickel, molybdenum, silver, copper and mixture thereof.

14. The catalyst produced by method of claim 1 wherein the phenylenediamine is selected from the group consisting of m-phenylenediamine, o-phenylenediamine, p-phenylenediamine and a substitute of the mentioned phenylenediamines.

15. The catalyst produced by method of claim 1 wherein in step 2) metal oxidant is added.

16. The catalyst produced by method of claim 1 wherein heating in the temperature range 700° C.-1000° C. (steps c) and e)) is carried out in nitrogen atmosphere.

17. The catalyst produced by method of claim 1 wherein heating in the temperature range 700° C.-1000° C. (steps c) and e)) is carried out in the atmosphere of gaseous products of decomposition.

18. The catalyst produced by method of claim 1 wherein step c is followed by d) leaching the mixture, and e) heating in the temperature range 700° C.-1000° C.

19. The catalyst produced by method of claim 1 wherein the catalysts support is selected from the group consisting of carbon blacks, graphite, expanded graphite, graphene, titania, silica, and metal nitrides.

20. An air electrode assembly for zinc-air batteries and fuel cells that comprises of a current collector, a hydrophobic layer, and a catalyst layer wherein the catalyst layer includes the catalyst produced by method of claim 1.

* * * * *